April 2, 1929. F. P. GLOSH 1,707,852
MIXING MACHINE
Filed Feb. 7, 1927  3 Sheets-Sheet 3
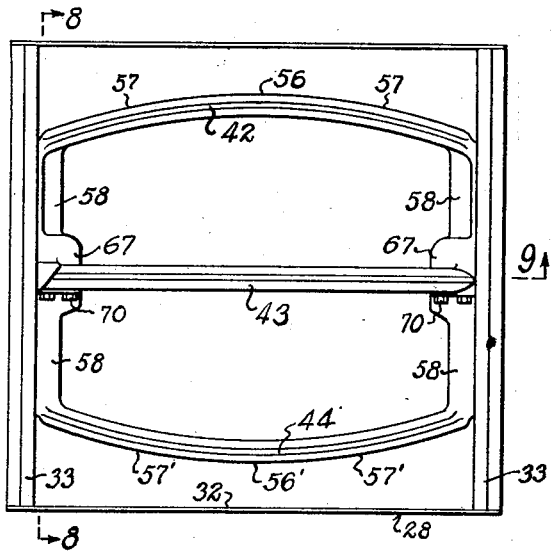
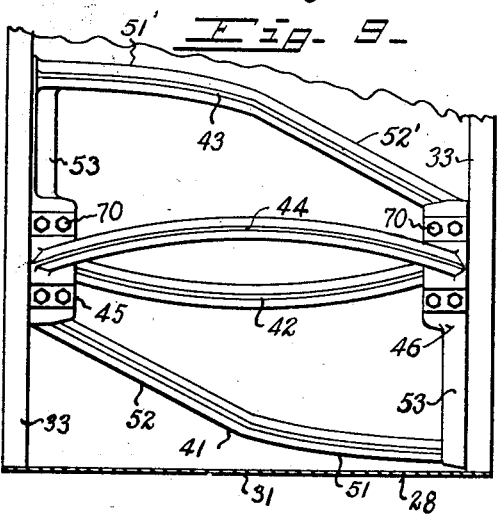
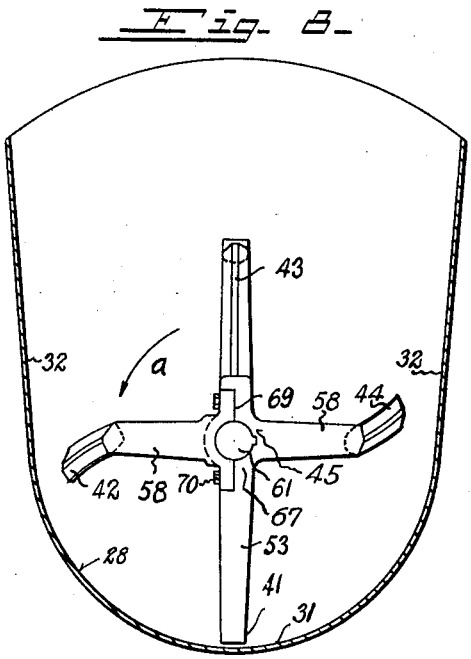
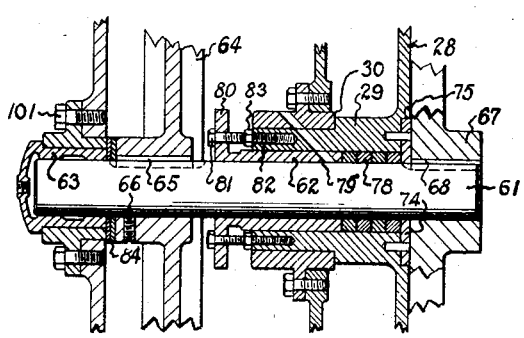

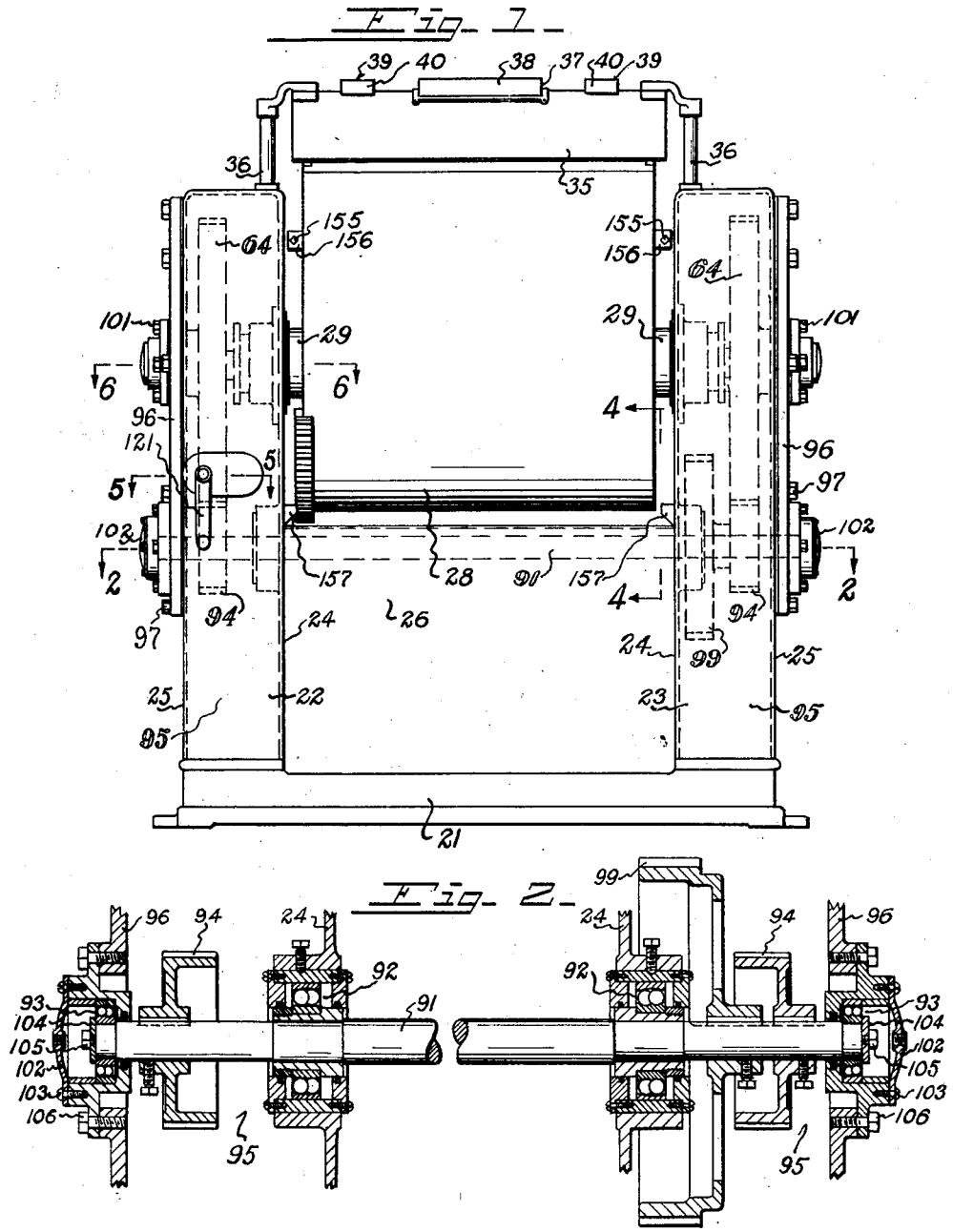

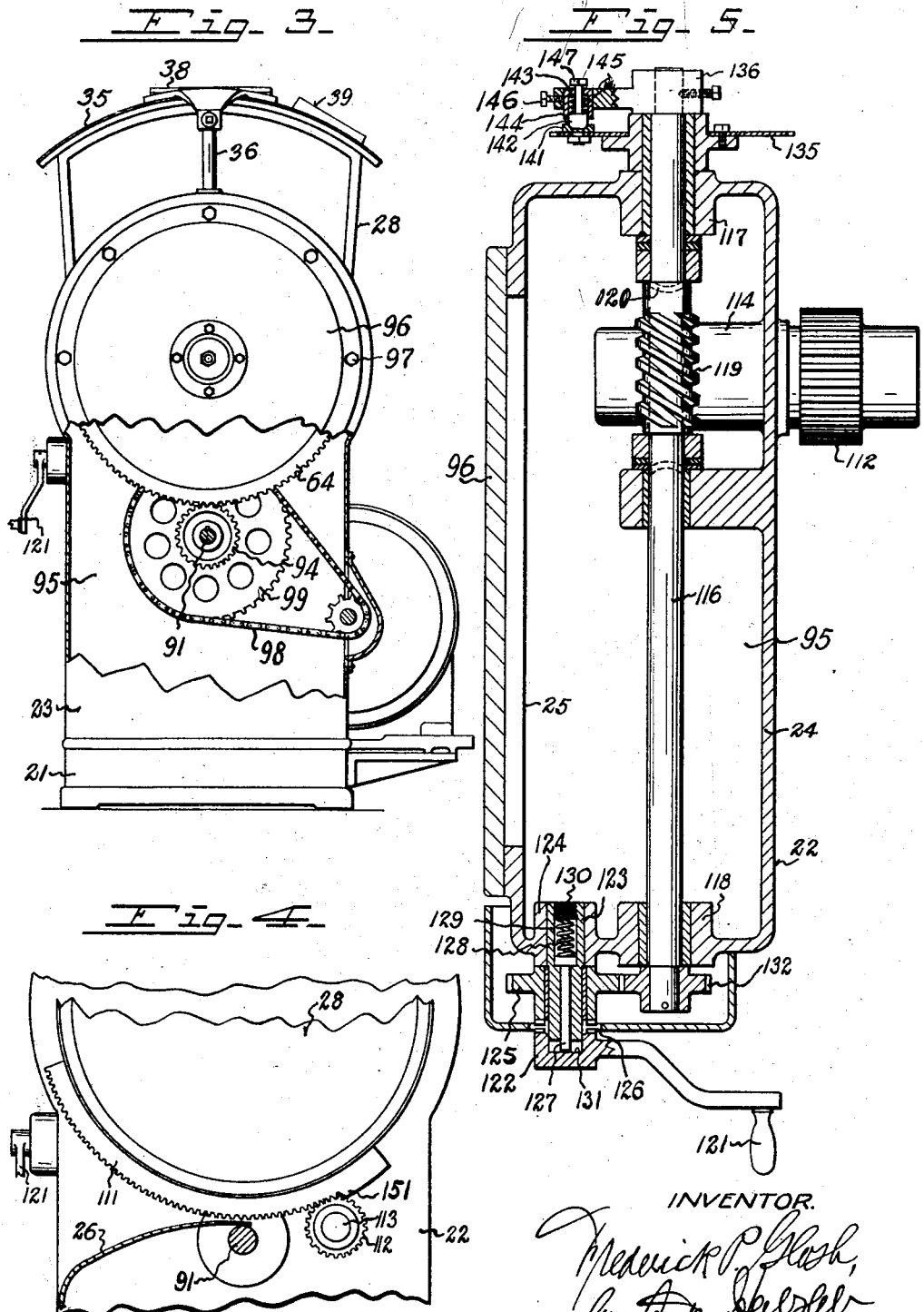

Patented Apr. 2, 1929.

1,707,852

UNITED STATES PATENT OFFICE.

FREDERICK P. GLOSH, OF CINCINNATI, OHIO, ASSIGNOR TO THE TRIUMPH MANUFACTURING COMPANY, OF CINCINNATI, OHIO, A CORPORATION OF OHIO.

MIXING MACHINE.

Application filed February 7, 1927. Serial No. 166,422.

My invention relates to mixing machines, especially to mixing machines for mixing ingredients for dough in the baker's art, although the same may be employed for other mixing purposes.

It is the object of my invention to provide new and improved means for imparting mixing movements to the ingredients for rapidly causing mingling of the same for producing the mixture and when employed as a dough mixer for rapidly mixing the flour and the other ingredients and quickly producing a homogenous mass with a minimum heating of the same.

It is the object of my invention further to provide novel means for mixing the flour and other ingredients by endwise movements of the ingredients in the bowl in opposite directions throughout substantially the length of the bowl, and in simultaneously opposite directions; and, further, to provide novel means for moving the dough in one direction throughout substantially the length of the bowl, then moving the dough in simultaneously opposite directions, then in the direction opposite to the first mentioned direction throughout substantially the length of the bowl, and again in simultaneously opposite directions, for thoroughly mingling the ingredients and quickly producing a homogenous mass.

It is the object of my invention further to provide a dough mixing machine in which the gluten is quickly and highly developed by providing a rotary mixing device comprising mixing bars including a bar having inclinations at various angles in its approach toward the axis of rotation of the rotor and a bar having a curvature with relation to a distance from said axis of rotation and in the direction of its path of travel; further, to provide a rotary mixing device having a plurality of one or both of said bars; and, further, to provide a rotary mixing device in which said bars alternate.

It is the object of my invention to provide novel means whereby a maximum amount of water is absorbed in the dough and whereby the gluten in the flour is rapidly and highly developed while a detrimental increase in temperature in the mixture is avoided, and whereby the mass is moved endwise, aerated, tucked under and kneaded, and whereby rapid and even distribution of the yeast throughout the mass takes place for producing a readily rising dough.

It is the object of my invention further to provide novel means in a machine of the character mentioned whereby the rotary mixing device is removable without disturbing the driving means therefor; further, to provide novel means for renewing the packing for the shaft of the rotary mixing device from the interior of the bowl; further, to provide novel means for causing rotation of the rotary mixing device and relieving the same from end thrusts of its driving means; further, to provide novel means for causing interruption in the driving means for tilting the bowl for preventing accident; and, further, to provide a novel frame structure in a device of the character described comprising hollow end pedestals for supporting bearings at the respective ends of the rotary mixing device and containing driving means for the respective ends of the rotary mixing device interconnected for simultaneous power application at the respective ends of the rotary mixing device.

The invention will be further readily understood from the following description and claims, and from the drawings, in which latter:

Fig. 1 is a front elevation of my improved device.

Fig. 2 is a detail view of the cross-shaft, the gearing thereon and its bearings, shown in axial section on the line 2—2 of Fig. 1, and partly broken away.

Fig. 3 is an end elevation of my improved device, partly broken away.

Fig. 4 is a detail view of the bowl tipping means, taken on the section line 4—4 of Fig. 1, and partly broken away.

Fig. 5 is an axial section of the same, taken in the plane of the line 5—5 of Fig. 1.

Fig. 6 is an axial section of the pivoting and driving means at one end of the bowl, taken on the line 6—6 of Fig. 1, and partly broken away.

Fig. 7 is a plan view of the mixing bars and bowl of my improved device, with the cover of the bowl removed.

Fig. 8 is a cross-section of the same, taken on the line 8—8 of Fig. 7, and,

Fig. 9 is a side elevation of the rotary mixing device, with the bowl shown in section on the line 9—9 of Fig. 7, and partly broken away.

In the present exemplification, the machine comprises a substantial base 21, from which hollow columns 22, 23, extend upwardly at the respective ends thereof. Each of these columns is shown as comprising an inner wall 24 and an outer wall 25, and front and rear walls. An apron 26 extends above the base between the columns.

A bowl or receptacle 28 is pivotally mounted on the frame, as by providing the respective ends of the bowl with trunnions 29, journaled in bearings 30, in the respective columns. This bowl preferably comprises a lateral wall having a lower portion 31, which is arcuate in cross-section, and upper portions 32 which are shown tangential to said arc. The bowl has end walls 33 from which said trunnions extend.

A cover 35 may be provided for the bowl, this cover being shown stationary and mounted on posts 36 extending upwardly from the columns. The cover is provided with a central feeding opening 37 normally closed by a door 38, and is also provided with openings 39, normally closed by doors 40.

A rotary mixing device is rotatable in the bowl. This rotary mixing device is exemplified as comprising mixing bars 41, 42, 43, 44. These mixing bars are supported from end walls 45, 46, of the rotary mixing member. The bars are shown integral with the respective end walls of the rotary mixing device. The bars act complemental to the wall of the bowl and are arranged in novel manner for producing mixing of the ingredients rapidly and thoroughly. The bar 41 is provided with a portion 51 at one end thereof which approaches the arcuate wall of the bowl, when nearest said arcuate wall, and a slanting portion 52 which recedes from said arcuate wall, when nearest thereto, toward the axis of rotation of the rotary mixing member. The portion 51 forms a pressing portion for the dough, for kneading the dough, at one end of the bowl, and the balance of the bar acts to stretch the dough and to move the dough endwise toward the other end of the bowl, and the bar by centrifugal force upon the dough also acts to thrust the dough toward the opposite wall of the bowl toward which the bar is moving in the upper curved portion of its path, the bar stretching the dough for aerating the same, and also preferably passing through the mass of dough to greater or less extent for opening up the mass of dough for the reception of air and the pocketing of the air in the mass. The action upon the dough is also to fold the dough, and tuck the same, the thrusting of the dough and impact upon the opposite wall also aiding in forcing the air pocketed therein throughout the mass of the dough. This thrusting of the dough does not however result in violent impact with the opposite wall but rather in a rolling motion of the dough against said wall.

The portion 51 of the bar preferably recedes from the wall of the bowl, when closest thereto, with a slight curvature, the portion 52 of the bar slanting at greater inclination toward the axis of the rotary mixing member. The bar 41 is shown located in a radial plane of the rotary mixing member, and as extending from an arm 53 at one end of the rotary mixing member to the bearing at the other end of said member.

The bar 42 is provided with an intermediate portion 56, shown as the middle portion of the bar, which has closest approach to the arcuate portion of the bowl, when in juxtaposition thereto, and portions 57 at the respective sides of the portion 56 receding from said arcuate portion for increasing the space between the bar toward its respective ends and the arcuate portion of the bowl, when proximate thereto. The bar is shown curved throughout its length, and as extending from arms 58 of the end walls of the rotary mixing member. This bar is also preferably inclined from its middle portion toward its ends in its path of rotation, exemplified in Figs. 8 and 9; this inclination being also preferably a curve. The bar is shown with its middle portion in advance of its end portions in its path of travel, which latter is indicated by the direction of the arrow $a$. The bar 42 acts to move the dough simultaneously endwise in opposite directions, for stretching the mass of dough toward the ends of the bowl for aerating the dough, and also preferably passing through the mass of the dough to greater or less extent for opening of the mass of dough for the reception of air and the pocketing of the air in the mass, the air being caused to permeate the mass in the working of the dough. The bar 42 also causes thrusting of the dough against the opposite wall in manner similar to the thrusting of the dough by means of the bar 41. The middle portion of the bar 42 forms a pressing portion upon the dough for kneading the dough and for tucking the dough.

The bar 43 is shown similar to the bar 41, but arranged oppositely thereto in the bowl, similar parts being designated by similar reference numerals with the exponent prime. Its structure and functions are directionally opposite endwise to the structure and functions of the bar 41. The pressing or kneading end of this arm is at the opposite end of the bowl.

The bar 44 is similar to the bar 42, the parts being designated by similar reference numerals with the exponent prime.

Each of these bars is shown as having a pressing portion and a stretching portion, the pressing portion acting upon the dough in different paths in the bowl and the inclined stretching portions acting upon the dough in intermediate paths in said bowl.

I have shown a pair of each of these kinds of bars, although one or more of each of the same in suitable sequence may be employed.

My improved bars act upon the ingredients for rapidly mixing the same, and in the case of dough, for rapidly mixing the ingredients of the dough and causing the rapid formation of a homogenous mass capable of absorbing a larger percentage of moisture than has heretofore been the general practice in the baker's art, and for quickly and highly developing the gluten and permeating the yeast throughout the mass, and effecting the mixing of the dough and development of the gluten rapidly, and acting upon the dough in manner to prevent excessive heating of the same, and thereby avoiding detrimental effect upon the raising qualities of the dough. It also produces a dough which bakes extremely light in color.

The rotary mixing member is preferably a member which is centrally open and free of obstruction to the crosswise movement of the dough therethrough, for instance when thrusting the dough in respectively opposite diagonal directions by the respectively oppositely inclined bars of the rotary mixing member, and the driving means are provided in such manner as to avoid obstruction of said open condition of the rotary mixing member.

The rotary mixing member is mounted upon oppositely extending shafts 61, which are spaced apart endwise and which extend oppositely outward from the respective ends of the rotary mixing member. Each of these shafts is exemplified as journaled in a bearing 62, shown as a sleeve located in the trunnion 29. This bearing is complemental to the inner wall of the column. An outer bearing 63, supported by the outer wall of the column, is also provided for the shaft. A gear 64 is rotatively fixed to the shaft for rotating the same, as by means of a key connection 65, and the shaft may be fixed in the gear by a set screw 66. The rotary mixing member is provided with a bearing 67 about the inner end of the shaft, and is rotatively connected thereto, as by a key 68.

The rotary mixing member is preferably so constructed that it may be removed from its shafts without disturbing the turning means therefor, for providing for ready cleaning of the inside of the bowl and of the rotary mixing member. For accomplishing this, the rotary mixing member is provided with a parting line 69, for dividing the rotary mixing member into sections, each of the sections preferably comprising a part of the bearings about the respective shafts at the ends of said member, the sections being secured together by means of clamp bolts 70. Each of these sections preferably comprises one or more of the mixing bars.

The rotative connections between the rotary mixing member and the shafts are preferably such as to permit endwise slippage between said rotary mixing member and said shafts to equalize end contact between the arms of said rotary mixing member and the end walls of the bowl for maintaining the bowl clean and insuring for mixing all the ingredients in the bowl in the batch being mixed.

Novel means are provided for lubricating the shafts of the rotary mixing member, and for renewing the packing thereof from the inside of the bowl, so as to avoid dismantling of the mounting of the shafts. Thus a washer 74 is provided about the shaft at each end of the rotary mixing member between the latter and the end wall of the bowl. This washer is preferably let into a recess 75 in said end wall. The outer periphery of the washer and the outer wall of the recess having slide connection between them for permitting axial movement of the washer with any axial movements there may be of the rotary mixing member, and maintaining an intimate joint between said rotary mixing member and the washer and between the washer and the wall of the recess in the bowl, as well as with the shaft, to avoid the passage of lubricant into the bowl and the passage of liquid from the bowl along the shaft.

A packing 78, which may be fibrous or other material, is received about the shaft, several rings of this packing being shown. This packing and the sleeve 62 are located in a bore 79 of the trunnion. This sleeve forms a gland which acts on the packing to compress the same, and is adjustable, as by providing the sleeve with a flange 80 through which bolts 81 are received, the bolts being threaded into threaded holes 82 in the end of the trunnion, jamb nuts 83 locking the bolts in adjusted positions.

The gears 64 are exemplified as gears having spiral teeth, the spirals on the respective gears being preferably opposite. Endwise thrust on said gears is resisted by step washer bearings 84 between the outer ends of said gears and the bearings 63 respectively.

A cross-shaft 91 extends between the columns and is exemplified as journaled in bearings 92, 93, in the respective inner walls and outer walls of said respective columns. These bearings are exemplified as ball bearings, provided with lubricant retaining means, and as constructed for ready dismantling. The cross-shaft has spiral pinions 94 fixed thereto, which mesh with the spiral gears 64. These gears and pinions are shown mounted in the cavity 95 of the respective columns.

The outer walls of said columns are exemplified as each formed with a removable section 96, each of these sections containing the outer end bearings for the shafts respectively of the rotary mixing member and of the cross-shaft, the removable section being secured to the main section of the outer wall by clamp bolts 97. The gears in the cavities of the respective columns are exposed by removal of said removable outer wall sections, the gland adjustments for the lubricant packings of the shafts for the rotary mixing member being also exposed by such removal, for adjustment and attention of the parts.

The cross-shaft 91 is driven by a silent chain 98 suitably driven and received about a silent gear 99 fixed to said shaft.

The outer bearings 63 are removable by removal of the clamp bolts 101 securing the same in place. The outer bearings 93 are removable by removal of the closing plate 102, by release of the fastening screws 103, and removal of the retaining washer 104 by unscrewing the securing bolt 105, whereupon the outer bearing may be removed by removing the clamp bolts 106.

The bowl is arranged to be tilted for moving the bowl into up-position for reception of the charge therein and for the mixing movements, and is arranged to be tilted forwardly and downwardly for inspection if desired and for discharge of the mixed materials. The bowl is provided with a circular rack 111 fixed thereto, with the teeth of which a pinion 112 meshes. The pinion is on the stub shaft 113 journaled in a bearing 114 in one of the columns. A shaft 116 is journaled in bearings 117, 118, in the front and rear walls of one of the columns and has fixed thereon a helical gear 119 with which a helical pinion 120 on the stub shaft 113 meshes.

Means may be provided for operating the shaft by hand or by power. Hand operation is accomplished by means of a crank handle 121, whose hub 122 is received about a shaft 123, journaled in a bearing 124 in the column. A pinion 125 is fixed to said shaft. There is a tooth clutch 126 between said pinion and the hub of the crank handle. A spring-pressed rod 127, urged outwardly by a spring 128 held in a bore 129 in the shaft 123 by a threaded plug 130, normally acts upon the outer wall 131 of the hub of the crank handle for normally releasing the clutch. When it is desired to tilt the bowl by hand, the handle 121 is pressed inwardly for engaging the clutch, whereby rotation of the pinion 125 may be effected. The pinion 125 meshes with a pinion 132 fixed to the shaft 116.

For tilting the bowl by power a suitable driving means suitably operated is provided, exemplified as comprising a sprocket gear 135 which rotates loosely about the shaft 116. An arm 136 is fixed to said shaft. There is a safety drive connection between said gear and said arm for causing the rotation of the arm with the gear during normal resistance to tilting of the bowl. Upon excess resistance to tilting of the bowl, this safety connection releases to prevent breakage. The safety connection is instanced as a socket piece 141 fixed to the gear, and a plug 142 normally received in the socket of said socket piece and pressed therein by a spring 143 in the bore of a socket piece 144 adjustably secured in axial direction in a bearing 145 by means of a set screw 146. A collar 147 fixed to the outer end of the plug coacts with the socket piece to limit outward movement of the plug. Upon excess resistance to the tilting of the bowl, for instance when the bowl has reached one of its limits of movement and power application is continued, the safety connection will release. The safety connection is readily reconnected for normal drive relation between the parts.

Upward tilting of the bowl is limited by the pinion 112 coacting with a stop 151 on the rack 111.

Downward tilting of the bowl is limited by coaction of stops 155 shown as adjustable bolts adjustable in lugs 156 on the end walls of the bowl coacting with stops 157 on the pedestals.

Having thus fully described my invention, what I claim as new, and desire to secure by Letters Patent, is:

1. In a high speed dough mixing and gluten developing machine, the combination of a bowl having a wall provided with an arcuate portion, and a rotary mixing member complemental to said wall comprising a bar which is inclined from its middle toward both its ends in opposite directions and away from said arcuate portion of said bowl when in juxtaposition to said arcuate portion and toward the axis of rotation of said rotary mixing member and is inclined from its middle toward both its ends in opposite directions in its path of travel.

2. In a high speed dough mixing and gluten developing machine, the combination of a bowl having a wall, and a rotary mixing member complemental to said wall comprising a bar which is inclined from its middle toward both its ends in opposite directions both toward the axis of rotation of said rotary mixing member and in its path of travel, and a bar which has closer approach toward its axis of rotation at one end than at its other, said bars acting alternately on the material in the bowl.

3. In a high speed dough mixing and gluten developing machine, the combination of a bowl having a wall, and a rotary mixing member comprising planetary bars complemental to said wall, a portion of said bars shaped to incline respectively in opposite directions toward the axis of rotation of said rotary mixing member and another portion of said bars shaped to incline recedingly from its middle to said respective ends, and arranged for moving progressively through the mass of the dough on said wall for stretching said dough and shifting the same endwise in sequentially opposite directions and in simultaneously opposite directions in alternation.

4. In a high speed dough mixing and gluten developing machine, the combination of a bowl having a wall, and a rotary mixing member comprising planetary mixing bars complemental to said wall including a bar having a squeezing portion at one end thereof for squeezing the dough between one end of said bar and said wall and an inclined portion for stretching said dough toward the other end of said bar, and a bar having an intermediate squeezing portion arranged for squeezing the dough at an intermediate portion thereof and end inclined portions at both ends of said intermediate portion for stretching said dough toward both ends of said bar, said bars acting alternately on the material in the bowl.

5. In a high speed dough mixing and gluten developing machine, the combination of a bowl having a wall, and a rotary mixing member comprising planetary mixing bars complemental to said wall respectively having squeezing portions at opposite ends thereof each arranged for squeezing the dough at one end of the mass thereof and stretching the dough toward the other end of the mass thereof in alternately opposite directions, and bars each having an intermediate squeezing portion and substantially equal end relief portions at both ends of said intermediate squeezing portion for squeezing the dough at an intermediate part of the mass thereof and stretching the dough in opposite directions arranged intermediate of said first-named bars.

6. In a high speed dough mixing and gluten developing machine, the combination of a bowl having a wall, a centrally open rotary mixing device complemental to said wall, and driving means for the respective ends of said rotary mixing device, said centrally open rotary mixing device at its periphery comprising inclined bars respectively having opposite end squeezing portions and intermediate oppositely inclined bars having intermediate squeezing portions acting to squeeze the dough at different separated points lengthwise of said rotary mixing device and to stretch the dough slantingly in paths between the rotary paths of said squeezing portions, said bars being independently supported and having free space between them in said rotary mixing device.

7. In a high speed dough mixing and gluten developing machine, the combination of a bowl having a wall, a centrally open rotary mixing device complemental to said wall, and driving means for the respective ends of said rotary mixing device, said centrally open rotary mixing device at its outer periphery comprising inclined bars respectively having opposite end squeezing portions and intermediate oppositely inclined bars which are inclined oppositely from their middle portions toward both their ends in their path of travel and have intermediate squeezing portions acting to squeeze the dough at different separated points lengthwise of said rotary mixing device and to stretch the dough slantingly in paths between the rotary paths of said squeezing portions, said bars being independently supported and having free space between them in the said rotary mixing device.

8. In a high speed dough mixing and gluten developing machine of the character described, the combination of a bowl having a wall, and a rotary mixing member comprising planetary mixing bars complemental to said wall including a bar which, when closest to said wall, at one end approaches said wall and toward its other end progressively recedes from said wall, and a bar which, when closest to said wall, approaches said wall at an intermediate portion of said bar and progressively recedes from said wall to substantially equal extent at both sides of said intermediate portion, said bars acting alternately on the material in said bowl.

9. In a high speed dough mixing and gluten developing machine, the combination of a bowl having a wall, and a rotary mixing member comprising planetary mixing bars complemental to said wall including a bar which, when closest to said wall, at one end approaches said wall and toward its other end progressively recedes from said wall, and a bar which, when closest to said wall, approaches said wall at an intermediate portion of said bar and progressively recedes from said wall to substantially equal extent and is inclined in its path of rotation at both sides of said intermediate portion.

10. In a high speed dough mixing and gluten developing machine of the character described, the combination of a bowl having a wall, and a rotary mixing member comprising planetary mixing bars complemental to said wall including a bar which, when closest to said wall, at one end approaches said wall and toward its other end progressively recedes from said wall, and a bar which, when closest to said wall, approaches said wall at an intermediate portion of said bar and progressively recedes from said wall and retreats in its path of rotation to substantially equal extent at both sides of said intermediate portion.

11. In a high speed dough mixing and gluten developing machine, the combination of a bowl having a wall, and a rotary mixing member comprising planetary pairs of mixing bars complemental to said wall, each of said pairs of mixing bars including a bar, which, when closest to said wall, at one end approaches said wall and toward its other end progressively recedes from said wall, and a bar which, when closest to said wall, approaches said wall at an intermediate portion of said bar and progressively recedes from said wall to substantially equal extent at both sides of said intermediate portion, said bars of said pairs of mixing bars coacting with said wall in alternation.

12. In a high speed dough mixing and gluten developing machine, the combination of a bowl having a wall, and a rotary mixing member comprising planetary pairs of mixing bars complemental to said wall, each of said pairs of mixing bars including a bar, which, when closest to said wall, at one end approaches said wall and toward its other end progressively recedes from said wall, and a bar which, when closest to said wall, approaches said wall at an intermediate portion of said bar and progressively recedes from said wall and is inclined in its path of rotation to substantially equal extent at both sides of said intermediate portion, said bars of said pairs of mixing bars coacting with said wall in alternation.

13. In a high speed dough mixing and gluten developing machine, the combination of a bowl having a wall comprising an arcuate portion, and a rotary mixing member comprising planetary mixing bars complemental to said wall including a bar which, when closest to said arcuate portion, at one end approaches said arcuate portion and toward its other end progressively recedes from said arcuate portion for stretching and aerating the dough and for squeezing the dough at one end of the mass thereof between said first-named end of said bar and said arcuate portion and for spreading said dough toward the other end of the mass thereof, and for thrusting the dough crosswise in said bowl for folding, tucking and bunching the same, and a bar which, when closest to said arcuate portion, approaches said arcuate portion at an intermediate portion of said bar and progressively recedes from said arcuate portion to substantially equal extent at both sides of said intermediate portion for stretching and aerating the dough and for squeezing the dough at an intermediate part of the mass thereof between said intermediate portion of said last-named bar and said wall and for spreading said dough endwise at both sides of said intermediate portion.

In testimony whereof, I have hereunto signed my name.

FREDERICK P. GLOSH.